United States Patent
Podgorny et al.

(10) Patent No.: US 11,334,820 B2
(45) Date of Patent: *May 17, 2022

(54) QUESTION PRIORITIZATION IN COMMUNITY-DRIVEN QUESTION-AND-ANSWER SYSTEMS

(71) Applicant: INTUIT INC., Mountain View, CA (US)

(72) Inventors: Igor A. Podgorny, San Diego, CA (US); Fedor N. Dzegilenko, San Jose, CA (US); Martha J. Fiske, Poway, CA (US); Jason A. Greschler, San Diego, CA (US); Floyd J. Morgan, Carlsbad, CA (US)

(73) Assignee: INTUIT, INC., Mountain View, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/442,762

(22) Filed: Jun. 17, 2019

(65) Prior Publication Data

US 2019/0303802 A1    Oct. 3, 2019

Related U.S. Application Data

(63) Continuation of application No. 12/841,821, filed on Jul. 22, 2010, now Pat. No. 10,366,349.

(51) Int. Cl.
| | |
|---|---|
| *G06Q 10/00* | (2012.01) |
| *G06Q 50/00* | (2012.01) |
| *G06Q 40/00* | (2012.01) |
| *G06Q 30/00* | (2012.01) |
| *G06F 16/00* | (2019.01) |

(52) U.S. Cl.
CPC ............ *G06Q 10/00* (2013.01); *G06F 16/00* (2019.01); *G06Q 30/00* (2013.01); *G06Q 40/00* (2013.01); *G06Q 50/00* (2013.01)

(58) Field of Classification Search
CPC ........ G06Q 10/00; G06Q 50/00; G06Q 40/00; G06Q 30/00; G06F 16/00
See application file for complete search history.

(56) References Cited

U.S. PATENT DOCUMENTS

| | | | |
|---|---|---|---|
| 6,064,978 A | 5/2000 | Gardner et al. | |
| 6,631,377 B2 | 10/2003 | Kuzumaki | |
| 2002/0143661 A1* | 10/2002 | Tumulty | H04M 3/523 705/7.36 |
| 2003/0179876 A1 | 9/2003 | Fox et al. | |

(Continued)

OTHER PUBLICATIONS

Kim, Questioners credibility judgements of answers in a social question and answer site, 2010 (Year: 2010).*

(Continued)

*Primary Examiner* — Sangeeta Bahl
(74) *Attorney, Agent, or Firm* — Patterson & Sheridan, LLP (57) ABSTRACT

Some embodiments provide a system that facilitates use of a question-and-answer system. During operation, the system determines a community value of a question submitted by a first user to the question-and-answer system. Next, the system prioritizes answering of the question by a second user in the question-and-answer system based on the community value.

20 Claims, 4 Drawing Sheets

(56) References Cited

U.S. PATENT DOCUMENTS

| | | | |
|---|---|---|---|
| 2006/0026593 A1* | 2/2006 | Canning | G06F 9/4843 |
| | | | 718/100 |
| 2007/0219958 A1* | 9/2007 | Park | G06F 16/3329 |
| 2008/0040427 A1* | 2/2008 | Shroff | G06Q 30/0603 |
| | | | 709/204 |
| 2008/0126954 A1* | 5/2008 | Schmidt | G06Q 30/02 |
| | | | 715/758 |
| 2008/0294637 A1* | 11/2008 | Liu | G06Q 30/0601 |
| | | | 705/26.1 |
| 2009/0119258 A1* | 5/2009 | Petty | G06Q 10/10 |
| 2009/0234710 A1 | 9/2009 | Belgaied Hassine et al. | |
| 2009/0276419 A1* | 11/2009 | Jones | G06F 16/3322 |
| | | | 707/999.005 |
| 2010/0073373 A1 | 3/2010 | Groff et al. | |
| 2010/0162135 A1* | 6/2010 | Wanas | G06Q 10/10 |
| | | | 715/753 |
| 2010/0235343 A1* | 9/2010 | Cao | G06F 16/951 |
| | | | 707/E17.108 |

OTHER PUBLICATIONS

Budalakoti, "expertise modeling and recommendation in online question and answer forum". (Year: 2009).*

* cited by examiner

FIG. 1

All Questions and Answers (199410 questions) How to ask

All Questions | Answered Questions | Unanswered Questions

Sort by: Date ▲ Priority ○ Latest Activity

‹Prev 1 2 3 ... Next›

Lifetime learning credit for scholar on J1
Would a research scholar on a J1 visa (resident alien) who took a course towards a professional certificate at NYU be eligible for the lifetime learning credit? The certificate course is not directly related to the research but is used to acquire/improve job skills for an alternative career.

Can't import from Quicken 2010P to TT Online - stuck in a loop at "Select Import Source" with no options.
I'm a TT Desktop user, but just because I have too much time on my hands and would like to be able to assist Online users, I tried starting an online return. I didn't get very far. I wanted to import interest income from Quicken 2010 Premier, but TT Online gets stuck at a screen that says "Select Import Source - Please select the source for your import" with the only choices being "Back" or ...

Where do I enter the partial sales of PTP and S
Bought and sold PTP several times in 2009 but did not complete with 150 shares, etc.) "Final K-1" box is not checked. 1) Sho the "investment income" and enter the rest of K-1 data on the View Profile — Close
tactusa
Points earned: 4111 | Questions answered: 1394
Questions asked: 2 | Answers received: 5

Printed out the forms to check information and there is an error on the IRA statement connected to form 8606. The nondeductible IRA $ from previous years and date the date is wrong. How is this inform correct ed through T.T. online.
T.T. does not allow a correction for previous 8606 years; just to submit by mail to IRS. I want the 1040 - 8606 form for 2009 corrected this year and next year when using T.T. the information will be correct.

MA deduction
On my MA Income and Deduction Summary, an item "National Guard & Reserve Members" comes out. I am not a National Guard nor a Reserve Member. How come I get this deduction? If it is an error, how can I correct it? Thanks.

can I have the taxes paid by direct debit from different accounts
we owe to school and state. i want to pay the state from my acct and the school from a joint acct. can i do this? it seems like it has attached itself to my acct. - shouldn't have entered it first..

I have the prepaid Turbo Tax subscription but it is not showing up on my account?

‹Prev 1 2 3 ... Next›

QUESTION PRIORITIZATION IN COMMUNITY-DRIVEN QUESTION-AND-ANSWER SYSTEMS

RELATED APPLICATIONS

The present patent is a continuation of, and hereby claims priority under 35 U.S.C § 120 to pending U.S. patent application Ser. No. 12/841,821, entitled "QUESTION PRIORITIZATION IN COMMUNITY-DRIVEN QUESTION-AND-ANSWER SYSTEMS," by the same inventors, filed on 22 Jul. 2010 (Client Ref. No.: 1004963US; P+S Ref. No.: INTU/0196US).

The subject matter of this application is also related to the subject matter in a co-pending non-provisional application by inventors Igor A. Podgorny, Fedor N. Dzegilenko, Floyd J. Morgan, Vineet Singh, Marc J. Attinasi and Troy D. Otillio, entitled "REAL-TIME USER BEHAVIOR PREDICTION," having Ser. No. 12/841,831, and filed on 22 Jul. 2010 (Client Ref. No.: 1004980US).

The subject matter of this application is also related to the subject matter in a co-pending non-provisional application by inventors Marc J. Attinasi, Igor A. Podgorny, Fedor N. Dzegilenko, Floyd J. Morgan, Vineet Singh and Troy D. Otillio, entitled "REAL-TIME TRACKING OF USER-APPLICATION INTERACTION," having Ser. No. 12/841,838, and filed on 22 Jul. 2010 (Client Ref. No.: 1005310US).

BACKGROUND

The present embodiments relate to question-and-answer (Q&A) systems. More specifically, the present embodiments relate to techniques for prioritizing the answering of questions in a Q&A system.

Q&A systems may allow communities of users to ask questions and/or provide answers to the questions. For example, a Q&A website may provide webpages that allow users to post questions, view the questions, answer the questions, rate the questions and/or answers, and/or add comments to the questions and/or answers. In addition, Q&A systems may be used to collect information of varying generality and/or specificity. For example, a general Q&A system may allow users to ask any question as long as the question adheres to behavioral guidelines for the Q&A system. Conversely, a more specific Q&A system may restrict questions and answers to those that pertain to a specific domain, such as an academic field, a hobby or interest, and/or a commercial product.

In addition, the success and/or effectiveness of a Q&A system may depend on the user base, the quality of questions and answers, and/or the motivation of users in the Q&A system. First, as with other community-driven systems, use of the Q&A system may be sustained only after the Q&A system is utilized by a critical mass of users. Along the same lines, the roles taken on by the users may affect the dynamic of the Q&A system. For example, the frequency with which each user asks and answers questions may affect the rate at which useful information is collected by the Q&A system.

Next, the Q&A system may provide useful information only if the questions and/or answers are intelligible, accurate, and relevant. For example, a user may be discouraged from using the Q&A system if answers to his/her questions tend to be of low quality and/or are difficult to understand. Conversely, a user may not answer a question if the user cannot understand the question and/or if the question is not relevant to the topics associated with the Q&A system.

Finally, the effectiveness of the Q&A system may depend on the ability to encourage user participation in the Q&A system. Moreover, user participation may be increased only if the users' motivations for using the Q&A system are effectively targeted. For example, monetary compensation for answering questions in the Q&A system may lead to a decrease in the quality of answers because users who provide the best answers in the Q&A system are typically motivated by a sense of altruism or community rather than financial gain.

Hence, Q&A systems may be improved by mechanisms that increase the quality and relevance of questions and answers and/or encourage positive user behavior among users of the Q&A systems.

SUMMARY

Some embodiments provide a system that facilitates use of a question-and-answer system. During operation, the system determines a business value of a question submitted by a first user to the question-and-answer system. Next, the system prioritizes answering of the question by a second user in the question-and-answer system based on the business value.

In some embodiments, the system further prioritizes answering of the question by the second user based on a community value of the question.

In some embodiments, the community value is associated with at least one of:
 (i) a user reputation of the first user;
 (ii) a popularity of the question;
 (iii) a participation rate of the first user in the question-and-answer system; and
 (iv) a recentness of the question.

In some embodiments, answering of the question is prioritized based on the community value if the second user is a voluntary participant in the question-and-answer system.

In some embodiments, determining the business value of the question involves determining a change in probability of a user action from the first user caused by answering of the question, and multiplying the change in probability by a price associated with the user action.

In some embodiments, the user action is at least one of adoption of a product associated with the question-and-answer system and use of technical support for the product.

In some embodiments, prioritizing answering of the question by the second user based on the business value involves at least one of ordering the question within a list of questions displayed to the second user, and assigning a point value to the question based on the business value.

In some embodiments, the first user and the second user are at least one of a voluntary participant in the question-and-answer system, a user of a product associated with the question-and-answer system, and an employee of a company associated with the product.

BRIEF DESCRIPTION OF THE FIGURES

FIG. 2 shows an exemplary screenshot in accordance with an embodiment.

DETAILED DESCRIPTION

In the figures, like reference numerals refer to the same figure elements.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating use of a question-and-answer (Q&A) system. The Q&A system may allow a community of users to submit and/or answer questions in a centralized forum. The Q&A system may also be associated with a specific field and/or product such as a software application. For example, the Q&A system may allow users to submit and/or answer questions related to tax preparation and/or a tax-preparation application.

More specifically, embodiments provide a method and system for prioritizing the answering of questions in a Q&A system. First, a business value of each question submitted to the Q&A system may be determined. The business value may correspond to the change in probability of a user action caused by answering of the question multiplied by a price associated with the user action. For example, if answering a user's question increases the user's likelihood of adopting a product associated with the Q&A system by 10% and the product costs $100, the business value of the question may be $10.

A community value of the question may also be determined. The community value may be based on the user's reputation, the question's popularity, the user's participation rate in the Q&A system, and/or a recentness of the question. For example, the question's community value may be higher if the user is an active participant in the Q&A system and/or the question is frequently viewed and/or commented on.

Finally, answering of the question may be prioritized based on the business value and/or community value. For example, the question may be placed higher in a list of questions displayed to other users of the Q&A system if the question has higher business and/or community value. The question may also include a point value that corresponds to the question's business and/or community value. The ordering and/or point value of each question may thus encourage the users of the Q&A system to answer questions in order of business and/or community value.

Figure 1:
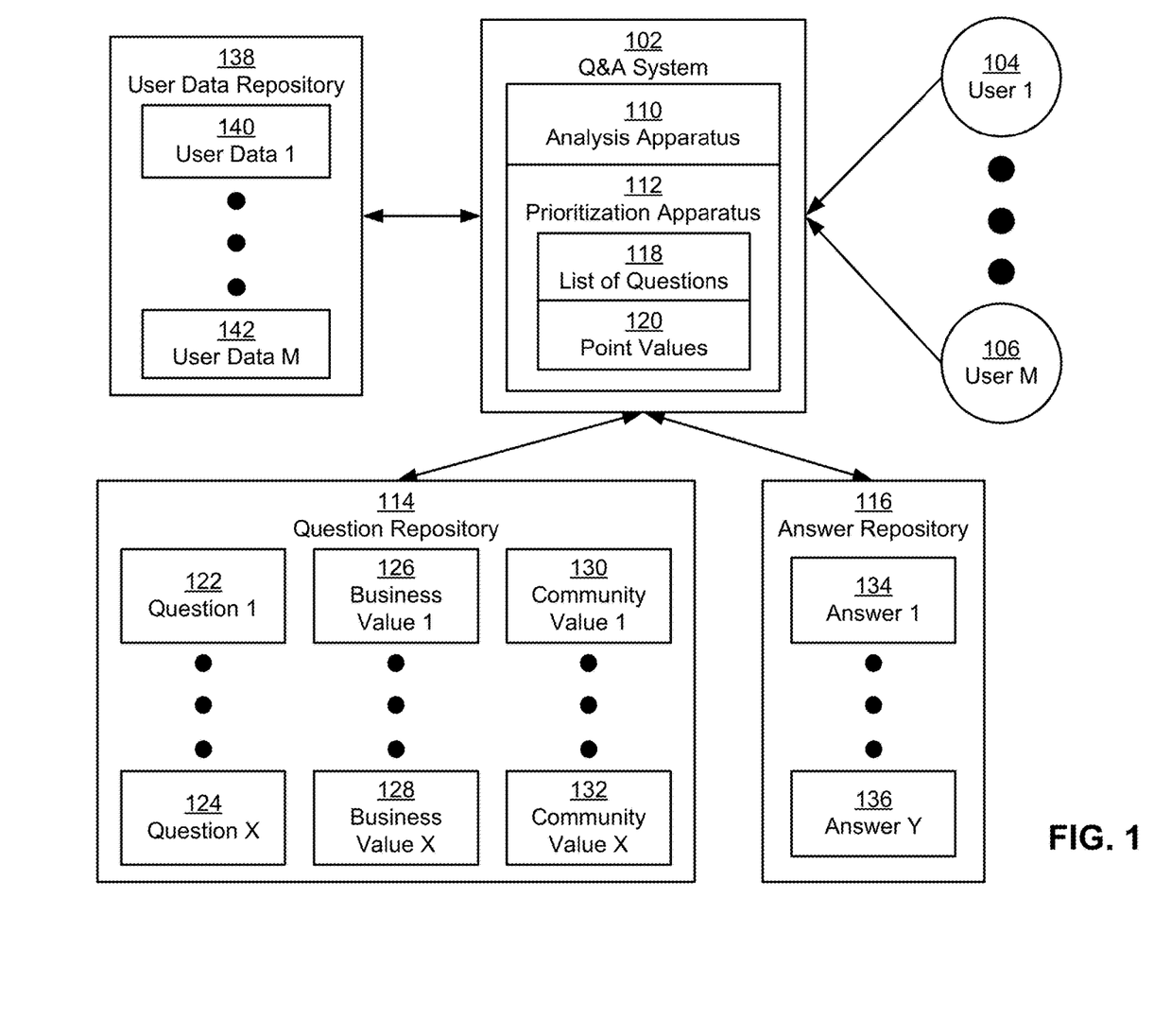
FIG. 1 shows the operation of a question-and-answer (Q&A) system in accordance with an embodiment.

FIG. 1 shows the operation of a question-and-answer (Q&A) system in accordance with an embodiment. Q&A system 102 may be accessed and/or used by a set of users (e.g., user 1 104, user m 106). For example, Q&A system 102 may provide a user interface (e.g., graphical user interface (GUI), web-based user interface, etc.) that allows the users to create user accounts, submit questions, view the questions, add comments to the questions, answer the questions, and/or rate the questions or answers. User account information for each user, such as a login, encrypted password, personal information (e.g., name, age, location, email address, etc.), and/or other information related to use of Q&A system 102 by the user, may be stored as user data (e.g., user data 1 140, user data m 142) in a user data repository 138. Along the same lines, questions (e.g., question 1 122, question x 124) submitted by the users may be stored in a question repository 114, and answers (e.g., answer 1 134, answer y 136) to the questions may be stored in an answer repository 116.

In one or more embodiments, Q&A system 102 is implemented using a client-server architecture. More specifically, Q&A system 102 may be executed on one or more servers. In addition, Q&A system 102 may be accessed from other machines using a web browser and network connection. In other words, Q&A system 102 may be implemented using a cloud computing system that is accessed over the Internet. Alternatively, some of Q&A system 102 may be locally installed on a computing system, such as a personal computer (PC), laptop computer, mobile phone, personal digital assistant (PDA), and/or other digital computing devices used by the users. For example, Q&A system 102 may include one or more servers and an application that is installed on the users' computing systems. The users may provide user data, questions, answers, and/or other data associated with Q&A system 102 through instances of the application, which transmit the data to the servers. The data may then be stored in one or more relational databases on the servers.

In addition, Q&A system 102 may facilitate the users' understanding of a specific field (e.g., topic, subject, category, etc.) and/or product (e.g., software, consumer products, services, etc.) by allowing the users to submit questions and answers related to the field and/or product. In other words, Q&A system 102 may provide a mechanism through which the users may obtain and/or give help or support for the field and/or product by interacting with one another. For example, Q&A system 102 may allow users of a tax-preparation application to ask and answer questions related to tax preparation and/or the tax-preparation application.

In turn, interaction among users of Q&A system 102 may promote user activity within the corresponding field and/or product. Using the example above, users of Q&A system 102 may submit questions about user issues with the tax-preparation application to Q&A system 102 and receive answers that allow the user issues to be resolved. As a result, users of Q&A system 102 may be more likely to adopt and/or continue using the tax-preparation application than non-users of Q&A system 102.

The functionality of Q&A system 102 may also be driven by a sense of community among the users. For example, Q&A system 102 may include a number of voluntary participants who answer questions for reasons of altruism, giving back, and/or interaction with other users rather than monetary gain. A voluntary participant may thus answer questions submitted to Q&A system 102 to bolster his/her reputation or prominence in Q&A system 102 and/or to connect with other users of Q&A system 102. For example, the voluntary participant may seek to increase a point total associated with his/her user account in Q&A system 102 and/or reach a "SuperUser" status in Q&A system 102 by answering questions clearly, thoughtfully, and/or thoroughly.

In one or more embodiments, Q&A system 102 includes functionality to prioritize the answering of questions by the users in a way that facilitates both business-oriented and community-oriented use of Q&A system 102. As shown in FIG. 1, Q&A system 102 includes an analysis apparatus 110 and a prioritization apparatus 112.

First, analysis apparatus 110 may determine a business value (e.g., business value 1 126, business value x 128) of each question submitted to Q&A system 102. The business value may correspond to a conditional expectation of revenue and/or cost savings from a first user submitting the question given the answering of the question by a second user. In particular, the business value may be calculated by determining a change in probability of a user action from the first user caused by answering of the question by the second user and multiplying the change in probability by a price associated with the user action. Furthermore, the user action may be adoption of the product associated with Q&A system 102 and/or use of technical support for the product. The business value may then be stored in question repository 114 and linked to the corresponding question.

For example, if the product costs $50 and answering of the question increases the first user's likelihood of adopting the product from 10% to 60%, the business value of the question may be $25, which is obtained by multiplying the increase in likelihood of adoption (e.g., 50%) by the cost of the product (e.g., $50). Similarly, if technical support costs for the product average $10 per user issue and answering of the question decreases the first user's likelihood of using technical support from 50% to 30%, the business value of the question may be $2, or the decrease in likelihood of using technical support (e.g., 20%) multiplied by the cost of technical support (e.g., $10).

In one or more embodiments, the change in probability of the user action is obtained by monitoring use of the product by the users and using a predictive model to assess the probability of the user action given use of the product with and without answering of the question. Monitoring product use is discussed in a co-pending non-provisional application by inventors Marc Attinasi, Igor A. Podgorny, Fedor Dzegilenko, Floyd Morgan, Vineet Singh and Troy Otillio and filed on the same day as the instant application entitled "Real-Time Tracking of User-Application Interaction," having Ser. No. 12/841,838, and filing date Jul. 22, 2010, now issued U.S. Pat. No. 8,386,966, which is incorporated herein by reference. Probabilistic user behavior analysis using a predictive model is discussed in a co-pending non-provisional application by inventors Igor A. Podgorny, Fedor Dzegilenko, Floyd Morgan, Vineet Singh, Marc Attinasi and Troy Otillio and filed on the same day as the instant application entitled "Real-Time User Behavior Prediction," having Ser. No. 12/841,831, and filing date Jul. 22, 2010, now issued U.S. Pat. No. 8,468,110 which is incorporated herein by reference.

Prioritization apparatus 112 may then prioritize answering of the question by the second user based on the business value of the question. In particular, prioritization apparatus 112 may order a list of questions 118 displayed to the second user and/or assign point values 120 to the questions based on the questions' respective business values. For example, a question with a high business value may be ordered near the top of the list and/or given a high point value to encourage answering of the question by other users.

Moreover, analysis apparatus 110 and prioritization apparatus 112 may enable the prioritization of questions submitted to Q&A system 102 based on the community value (e.g., community value 1 130, community value x 132) of each question. As mentioned previously, the amount and/or quality of information (e.g., questions and answers) collected by Q&A system 102 may be driven by a sense of community among users of Q&A system 102. Consequently, prioritization of questions by community value may further the sense of community, which in turn may increase the usefulness and/or quality of Q&A system 102.

In one or more embodiments, the community value of a question submitted by a user is associated with a user reputation of the user, a popularity of the question, a participation rate of the user in Q&A system 102, and/or a recentness of the question. As with the question's business value, the community value may influence the question's place in a list (e.g., list of questions 118) and/or point value (e.g., point values 120) in Q&A system 102. For example, a question submitted by a prominent and/or active user may be placed near the top of a list of questions displayed to other users (e.g., through a user interface). Similarly, a question with a large number of views and/or comments may be assigned a higher point value than questions with fewer views and/or comments. Prioritization of questions by business and/or community value is discussed in further detail below with respect to FIG. 2.

Because Q&A system 102 may be designed to facilitate use of a product (e.g., application), Q&A system 102 may include multiple types of users: voluntary participants, users of the product, and/or employees of a company associated with the product. Furthermore, Q&A system 102 may encourage participation in Q&A system 102 across all types of users by prioritizing questions differently for different types of users. For example, prioritization apparatus 112 may prioritize questions for voluntary participants based on both business and community value to facilitate interaction that is meaningful to the voluntary participants. On the other hand, prioritization apparatus 112 may prioritize questions for employees of the company based primarily or solely on business value so that the employees may facilitate adoption of the product and/or reduce costs associated with maintenance of and/or support for the product.

FIG. 2 shows an exemplary screenshot in accordance with an embodiment. More specifically, FIG. 2 shows a screenshot of a user interface for a Q&A system, such as Q&A system 102 of FIG. 1. The user interface may be provided by a webpage within a web browser and/or by an application that is locally installed on a computing system. In addition, the user interface may allow a user to ask and/or answer questions related to the subject of tax preparation and/or the use of a specific accounting or tax-preparation application.

As shown in FIG. 2, the user interface includes a list of questions 202-214 submitted by users of the Q&A system. Questions 202-214 may be prioritized based on a business value and/or community value associated with each question. For example, questions 202-214 may be displayed as shown in FIG. 2 if a user selects an element 220 (e.g., "Priority") to view questions submitted to the Q&A system in order of priority. Because questions 202-214 are displayed on the first of multiple pages in the user interface, questions 202-214 may correspond to high-priority questions. Alternatively, questions 202-214 and/or other questions in the Q&A system may be displayed in ascending and/or descending order of recentness if the user selects a different element 218 (e.g., "Date") in the user interface.

As described above, questions with a higher business value may be given higher priority than other questions in the Q&A system. For example, questions 202-204 may be placed at the top of the user interface because answering either question may significantly increase the probability that the corresponding user adopts the accounting or tax-preparation application and/or decrease the user's likelihood of using technical support for the accounting or tax-preparation application. In other words, answering of questions 202-204 may increase revenue for the company selling the application and/or decrease costs associated with technical support for the application.

Next, the high priority of question 206 may be based on the user reputation and/or participation rate of the corresponding user. In particular, user data 216 for the user indicates that the user answers far more questions (e.g., 1394) than he/she submits (e.g., 2), is associated with a high point total (e.g., 4111), and has "SuperUser" status. As a result, the user's participation in the Q&A system may add value to the Q&A system. Moreover, continued use of the Q&A system by the user may be facilitated by encouraging other users to answer question 206.

On the other hand, the popularity of questions 208-210 may trigger the prioritization of questions 208-210. Question 208 has a large number of views (e.g., 1278) and users who have added question 208 to personal watch lists (e.g., 4), while question 210 includes multiple (e.g., 18) comments. Such popularity may indicate that many users are interested in the answers to questions 208-210, thus corresponding to a significant amount of community value for questions 208-210.

Question 212 may be prioritized because question 212 may be submitted by a user who has spent a lot of time viewing existing questions and answers in the Q&A system and/or who is an active participant in the Q&A system. For example, question 212 may be placed on the first page of questions because the user frequently provides ratings and/or comments on other users' questions and/or answers, or because the user has searched extensively for other questions or answers related to question 212.

Finally, the recentness (e.g., "4/15/10 04:57 AM") and/or popularity of question 214 (e.g., "416 views") may give question 214 a high priority. Moreover, as question 214 becomes less recent, question 214 may be placed further down in the list of questions. For example, the user interface may display question 214 on the second or third page of questions a week after question 214 is submitted to the Q&A system.

Figure 3:
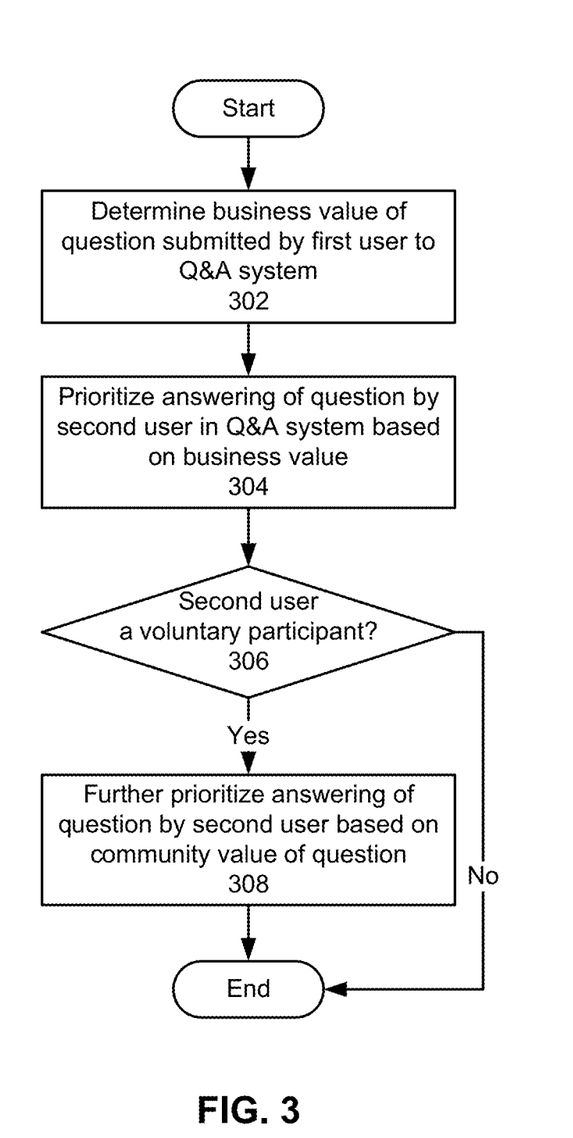
FIG. 3 shows a flowchart illustrating the process of facilitating use of a question-and-answer system in accordance with an embodiment.

FIG. 3 shows a flowchart illustrating the process of facilitating use of a Q&A system in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

First, a business value of a question submitted by a first user to the Q&A system is determined (operation 302). The business value may correspond to the expected increase in revenue and/or reduction in costs associated with answering the question. The business value may be obtained by determining a change in probability of a user action from the first user caused by answering of the question and multiplying the change in probability by a price associated with the user action. As a result, the question may be associated with a high business value if the answer significantly changes the user's likelihood of either adopting a product (e.g., application, consumer device, service, etc.) associated with the Q&A system or using technical support for the product. Conversely, the question may be associated with a low business value if the answer makes little to no difference in the user's subsequent behavior regarding the product, or if the answer dissuades the user from using the product.

Next, answering of the question by a second user in the Q&A system is prioritized based on the business value (operation 304). The prioritization may be carried out by ordering the question within a list of questions displayed to the second user and/or assigning a point value to the question based on the business value.

Additional prioritization of the question may be made if the second user is a voluntary participant (operation 306) in the Q&A system. In particular, answering of the question by the second user may be further prioritized based on a community value of the question (operation 308) if the second user is a voluntary participant. The community value of the question may be based on a user reputation of the first user, a popularity of the question, a participation rate of the first user in the Q&A system, and/or a recentness of the question. Moreover, such prioritization by community value may facilitate a connection and/or sense of community between the second user and other users of the Q&A system. For example, the question may be prioritized by community value to allow the second user to increase his/her user reputation (e.g., point total, user status, etc.) in the Q&A system and/or engage in rewarding interaction with the other users.

On the other hand, the question may be prioritized primarily and/or solely by business value if the second user is not a voluntary participant in the Q&A system. For example, the question may be prioritized only by business value if the second user is an employee of a company associated with (e.g., selling) the product to facilitate the answering of questions that increase revenue and/or decrease costs associated with the product.

Figure 4:
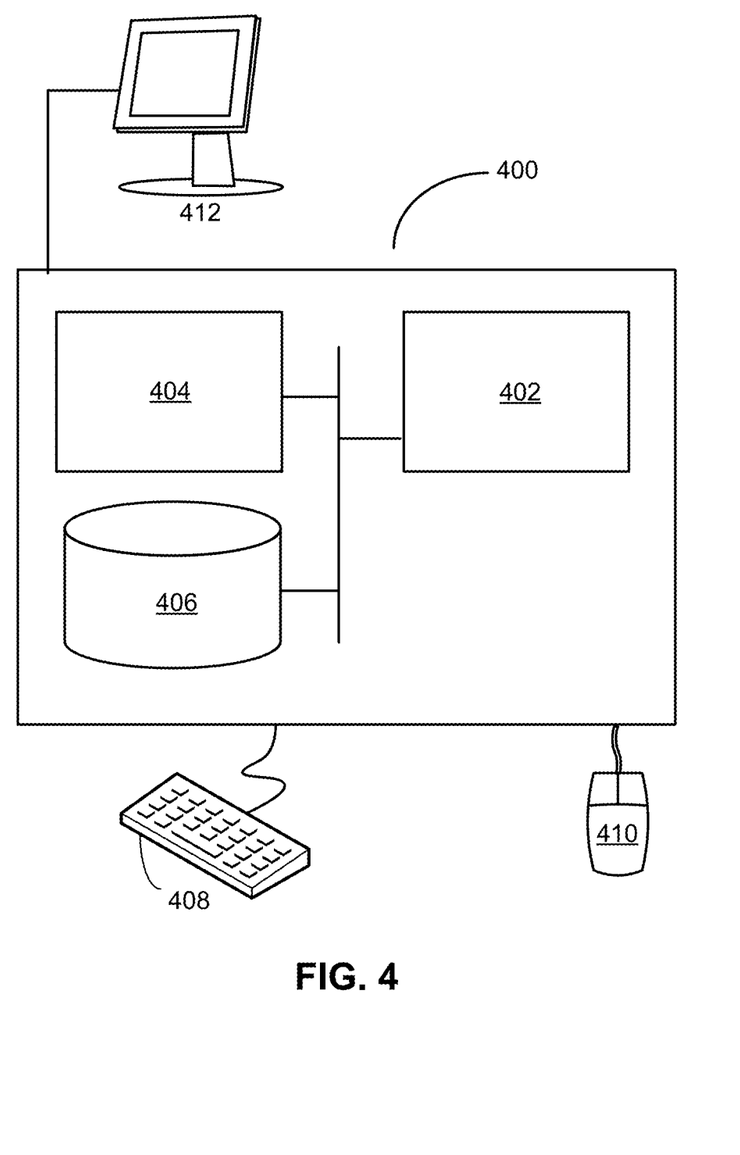
FIG. 4 shows a computer system in accordance with an embodiment.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may provide a Q&A system for a community of users. The Q&A system may include an analysis apparatus that determines a business value and/or a community value of a question submitted by a first user. The Q&A system may also include a prioritization apparatus that prioritizes answering of the question by a second user based on the business value and/or community value. For example, the prioritization apparatus may prioritize answering of the question by ordering the question within a list of questions displayed to the second user and/or assigning a point value to the question based on the business value.

In addition, one or more components of computer system 400 may be remotely located and connected to the other components over a network. Portions of the present embodiments (e.g., analysis apparatus, prioritization apparatus, etc.) may also be located on different nodes of a distributed system that implements the embodiments. For example, the present embodiments may be implemented using a cloud computing system that provides a web-based Q&A system for a product that is used by the users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating use of a web-based question-and-answer (Q&A) system, comprising:
    providing a user-interface for an application associated with the web-based Q&A system to a first computer and to one or more second computers;
    receiving, at a server of the web-based Q&A system, a first question submitted by a first user at the first computer using the user-interface;
    determining a community value of the first question based on user reputation or a participation rate of the first user in the web-based Q&A system;
    determining a business value of the first question by:
    using a predictive model to determine, based on probabilistic user behavior analysis, a change in a probability of a user action caused by answering the first question, wherein:
    the predictive model has been trained based on activity histories of a plurality of users;
    the change in the probability of the user action is determined based on probabilities, determined using the predictive model, of the user action with and without answering of the first question;
    the user action is associated with at least one of the following:
        a use of technical support for a product; or
        an adoption of the product; and
    the business value of the first question is further based on a technical support cost or a cost of the product;
    generating, by a processor, a list of questions comprising the first question and one or more other questions, wherein each respective question in the list of questions is associated with a respective community value;
    generating a prioritized list of questions for display to a second user based on the respective community value for each respective question in the list of questions such that questions in the prioritized list of questions that have a higher community value are displayed before questions in the prioritized list of questions that have a lower community value;
    transmitting, over a data channel, the prioritized list of questions to at least one of the one or more second computers, wherein the at least one of the one or more second computers is associated with the second user, and wherein the at least one of the one or more second computers displays the prioritized list of questions to the second user;
    receiving, from the second user, based on the prioritized list of questions, an answer to the first question;
    storing the answer in an answer repository;
    determining a point value of the first question based on the community value of the first question and the business value of the first question; and
    increasing, based on receiving the answer from the second user and based on the point value of the first question, a point total of a corresponding user account of the second user in the web-based Q&A system.

2. The computer-implemented method of claim 1, wherein the prioritized list of questions is further prioritized based on a recentness of each question in the list of questions.

3. The computer-implemented method of claim 1, wherein the first question relates to a product associated with the web-based Q&A system.

4. The computer-implemented method of claim 1, further comprising, prior to generating the prioritized list of questions, determining that the second user is a voluntary participant in the web-based Q&A system.

5. The computer-implemented method of claim 1, wherein the first user is a voluntary participant in the web-based Q&A system and a user of a product associated with the web-based Q&A system.

6. The computer-implemented method of claim 1, wherein the prioritized list of questions is further prioritized based on a business value associated with each question in the list of questions.

7. The computer-implemented method of claim 1, determining the community value of the first question comprises determining a point value.

8. A computer system for facilitating use of a web-based question-and-answer (Q&A) system, comprising:
    a processor; and
    a memory comprising instructions that, when executed by the processor, cause the processor to perform a method, the method comprising:
    providing a user-interface for an application associated with the web-based Q&A system to a first computer and to one or more second computers;
    receiving, at a server of the web-based Q&A system, a first question submitted by a first user at the first computer using the user-interface;
    determining a community value of the first question based on user reputation or a participation rate of the first user in the web-based Q&A system;
    determining a business value of the first question by:
    using a predictive model to determine, based on probabilistic user behavior analysis, a change in a probability of a user action caused by answering the first question, wherein:
    the predictive model has been trained based on activity histories of a plurality of users;

the change in the probability of the user action is determined based on probabilities, determined using the predictive model, of the user action with and without answering of the first question;
the user action is associated with at least one of the following:
a use of technical support for a product; or
an adoption of the product; and
the business value of the first question is further based on a technical support cost or a cost of the product;
generating, by a processor, a list of questions comprising the first question and one or more other questions, wherein each respective question in the list of questions is associated with a respective community value;
generating a prioritized list of questions for display to a second user based on the respective community value for each respective question in the list of questions such that questions in the prioritized list of questions that have a higher community value are displayed before questions in the prioritized list of questions that have a lower community value;
transmitting, over a data channel, the prioritized list of questions to at least one of the one or more second computers, wherein the at least one of the one or more second computers is associated with the second user, and wherein the at least one of the one or more second computers displays the prioritized list of questions to the second user;
receiving, from the second user, based on the prioritized list of questions, an answer to the first question;
storing the answer in an answer repository;
determining a point value of the first question based on the community value of the first question and the business value of the first question; and
increasing, based on receiving the answer from the second user and based on the point value of the first question, a point total of a corresponding user account of the second user in the web-based Q&A system.

9. The computer system of claim 8, wherein the prioritized list of questions is further prioritized based on a recentness of each question in the list of questions.

10. The computer system of claim 8, wherein the first question relates to a product associated with the web-based Q&A system.

11. The computer system of claim 8, further comprising, prior to generating the prioritized list of questions, determining that the second user is a voluntary participant in the web-based Q&A system.

12. The computer system of claim 8, wherein the first user is a voluntary participant in the web-based Q&A system and a user of a product associated with the web-based Q&A system.

13. The computer system of claim 8, wherein the prioritized list of questions is further prioritized based on a business value associated with each question in the list of questions.

14. The computer system of claim 8, determining the community value of the first question comprises determining a point value.

15. A non-transitory computer-readable medium comprising instructions that, when executed by a processor, cause the processor to perform a method for facilitating use of a web-based question-and-answer (Q&A) system, the method comprising:
providing a user-interface for an application associated with the web-based Q&A system to a first computer and to one or more second computers;
receiving, at a server of the web-based Q&A system, a first question submitted by a first user at the first computer using the user-interface;
determining a community value of the first question based on user reputation or a participation rate of the first user in the web-based Q&A system;
determining a business value of the first question by:
using a predictive model to determine, based on probabilistic user behavior analysis, a change in a probability of a user action caused by answering the first question, wherein:
the predictive model has been trained based on activity histories of a plurality of users;
the change in the probability of the user action is determined based on probabilities, determined using the predictive model, of the user action with and without answering of the first question;
the user action is associated with at least one of the following:
a use of technical support for a product; or
an adoption of the product; and
the business value of the first question is further based on a technical support cost or a cost of the product;
generating, by a processor, a list of questions comprising the first question and one or more other questions, wherein each respective question in the list of questions is associated with a respective community value;
generating a prioritized list of questions for display to a second user based on the respective community value for each respective question in the list of questions such that questions in the prioritized list of questions that have a higher community value are displayed before questions in the prioritized list of questions that have a lower community value;
transmitting, over a data channel, the prioritized list of questions to at least one of the one or more second computers, wherein the at least one of the one or more second computers is associated with the second user, and wherein the at least one of the one or more second computers displays the prioritized list of questions to the second user;
receiving, from the second user, based on the prioritized list of questions, an answer to the first question;
storing the answer in an answer repository;
determining a point value of the first question based on the community value of the first question and the business value of the first question; and
increasing, based on receiving the answer from the second user and based on the point value of the first question, a point total of a corresponding user account of the second user in the web-based Q&A system.

16. The non-transitory computer-readable medium of claim 15, wherein the prioritized list of questions is further prioritized based on a recentness of each question in the list of questions.

17. The non-transitory computer-readable medium of claim 15, wherein the first question relates to a product associated with the web-based Q&A system.

18. The non-transitory computer-readable medium of claim 15, further comprising, prior to generating the prioritized list of questions, determining that the second user is a voluntary participant in the web-based Q&A system.

19. The non-transitory computer-readable medium of claim 15, wherein the first user is a voluntary participant in the web-based Q&A system and a user of a product associated with the web-based Q&A system.

20. The non-transitory computer-readable medium of claim 15, wherein the prioritized list of questions is further prioritized based on a business value associated with each question in the list of questions.

\* \* \* \* \*